United States Patent
Martin et al.

(10) Patent No.: US 6,985,324 B2
(45) Date of Patent: Jan. 10, 2006

(54) COUNTERACTING GAS INGESTION IN A HYDRODYNAMIC BEARING SPINDLE MOTOR

(75) Inventors: Steve R. Martin, Louisville, CO (US); James A. Herbst, Longmont, CO (US); Eric N. Heiney, Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 174 days.

(21) Appl. No.: 10/629,935

(22) Filed: Jul. 29, 2003

(65) Prior Publication Data

US 2004/0156139 A1 Aug. 12, 2004

Related U.S. Application Data

(60) Provisional application No. 60/446,806, filed on Feb. 12, 2003.

(51) Int. Cl.
*G11B 15/18* (2006.01)

(52) U.S. Cl. ...................... 360/69; 360/234.1
(58) Field of Classification Search ............ 360/69, 360/234.1, 97.02, 99.08, 99.12, 230, 234.3, 360/235.4, 265.2, 265.6, 271.3, 254.2; 310/90; 384/100
See application file for complete search history.

(56) References Cited

U.S. PATENT DOCUMENTS

| | | | | |
|---|---|---|---|---|
| 5,136,438 A | * | 8/1992 | Wakatsuki et al. | 360/69 |
| 5,427,456 A | | 6/1995 | Hensel | 384/112 |
| 5,575,355 A | * | 11/1996 | Williams et al. | 184/55.1 |
| 5,710,678 A | | 1/1998 | Leuthold et al. | 360/99.08 |
| 6,059,459 A | | 5/2000 | Ichiyama | 384/112 |
| 6,066,903 A | | 5/2000 | Ichiyama | 310/90 |
| 6,078,471 A | * | 6/2000 | Fiske | 360/254.2 |
| 6,264,368 B1 | | 7/2001 | Tanaka et al. | 384/112 |
| 6,493,181 B1 | | 12/2002 | Ichiyama | 360/99.08 |
| 6,502,989 B1 | * | 1/2003 | Takeuchi et al. | 384/100 |
| 6,664,685 B2 | * | 12/2003 | Ameen et al. | 310/90 |
| 6,686,673 B1 | * | 2/2004 | Komura et al. | 310/90 |

* cited by examiner

*Primary Examiner*—David Hudspeth
*Assistant Examiner*—Fred F. Tzeng
(74) *Attorney, Agent, or Firm*—Shumaker & Sieffert, PC

(57) ABSTRACT

According to one embodiment of the present invention, a method of counteracting gas ingestion in a hydrodynamic bearing of a spindle motor in a data storage device comprises waiting for activity of a host connected with the data storage device to become idle. When the activity of the host becomes idle, a determination is made whether to release gas from a fluid of the hydrodynamic bearing of the spindle motor. Responsive to determining to release gas from a fluid of the hydrodynamic bearing of the spindle motor a motor spin down routine for the spindle motor is performed.

30 Claims, 7 Drawing Sheets

COUNTERACTING GAS INGESTION IN A HYDRODYNAMIC BEARING SPINDLE MOTOR

RELATED APPLICATIONS

This application claims priority of U.S. provisional application Ser. No. 60/446,806, filed Feb. 12, 2003.

FIELD OF THE INVENTION

This application relates generally to data storage devices and more particularly to counteracting gas ingestion in a hydrodynamic bearing of a spindle motor.

BACKGROUND OF THE INVENTION

Various types of data storage devices store digital data in magnetic or optical form on a rotating storage medium. Modern magnetic disc drives, for example, comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a rotary actuator for movement of the heads substantially radially relative to the discs. Each of the concentric tracks is generally divided into a plurality of separately addressable data sectors. The read/write transducer, e.g. a magneto-resistive read/inductive write head, is used to transfer data between a desired track and an external environment. During a write operation, data is written onto the disc track and during a read operation the magneto-resistive read element of the head senses the data previously written on the disc track and transfers the information to the external environment.

The spindle motor typically includes a stator, a rotor and a spindle or shaft. The rotor may alternatively rotate with the shaft or the shaft may be stationary so that the rotor rotates about the shaft. Within a data storage device, the rotor includes a hub for supporting one or more of the data storage discs. During idle periods when the data storage device is neither reading nor writing data to the disc, the stator continuously energizes the rotor to overcome wind resistance as well as friction in the bearings as the rotor spins at high speed. Typical spindle motor speeds include 4,200 revolutions per minute and beyond.

The rotor of the spindle motor may be supported by a hydrodynamic fluid bearing. These bearings have proven useful in reducing wear in the spindle, reducing power consumption of the spindle motor and reducing vibration from the spindle motor compared to ball bearings. However, hydrodynamic bearings are susceptible to failure due to loss of hydrodynamic stiffness resulting from gas being trapped in the fluid of the bearing.

During operation, the spindle motor naturally draws in or ingests gas from the surrounding environment in the data storage device. Some of this gas is forced into the fluid of the hydrodynamic bearing. When the spindle motor is operated for an extended period of time, in some cases many days, the gas forced into the fluid of the hydrodynamic bearing can accumulate to the point at which it displaces the fluid in certain areas of the bearing resulting in a loss of hydrodynamic stiffness and part contact wear. This can cause the motor bearing components to wear and eventually fail. Accordingly there is a need for a method and apparatus for counteracting gas ingestion in a hydrodynamic bearing spindle motor. The present invention provides a solution to this and other problems, and offers other advantages over the prior art.

SUMMARY OF THE INVENTION

Against this backdrop the present invention has been developed. According to one embodiment of the present invention, a method of counteracting gas ingestion in a hydrodynamic bearing of a spindle motor in a data storage device comprises waiting for activity of a host connected with the data storage device to become idle. When the activity of the host becomes idle, a determination is made whether to release gas from a fluid of the hydrodynamic bearing of the spindle motor. Responsive to determining to release gas from the fluid of the hydrodynamic bearing of the spindle motor a motor spin down routine for the spindle motor is performed.

According to another embodiment of the present invention, a data storage device comprises a spindle motor having a rotating shaft, the rotating shaft supported by a hydrodynamic fluid bearing, a microprocessor coupled with the spindle motor to control rotation of the spindle motor, and a memory. The memory has stored therein a series of instructions representing a routine to counteract gas ingestion in a hydrodynamic bearing of the spindle motor in the data storage device. The routine, when executed by the microprocessor, causes the microprocessor to wait for activity of the host to which the data storage device is connected to become idle, determines whether to release gas from a fluid of the hydrodynamic bearing of the spindle motor, and responsive to determining to release gas from a fluid of the hydrodynamic bearing of the spindle motor, performs a motor spin down routine for the spindle motor.

These and various other features as well as advantages which characterize the present invention will be apparent from a reading of the following detailed description and a review of the associated drawings.

DETAILED DESCRIPTION

Embodiments of the present invention will be discussed with reference to a magnetic disc drive. One skilled in the art will recognize that the present invention may also be applied to any data storage device, such as an optical disc drive, a magneto-optical disc drive, or a compact disc drive, that utilizes a spindle motor having a hydrodynamic bearing.

Figure 1:
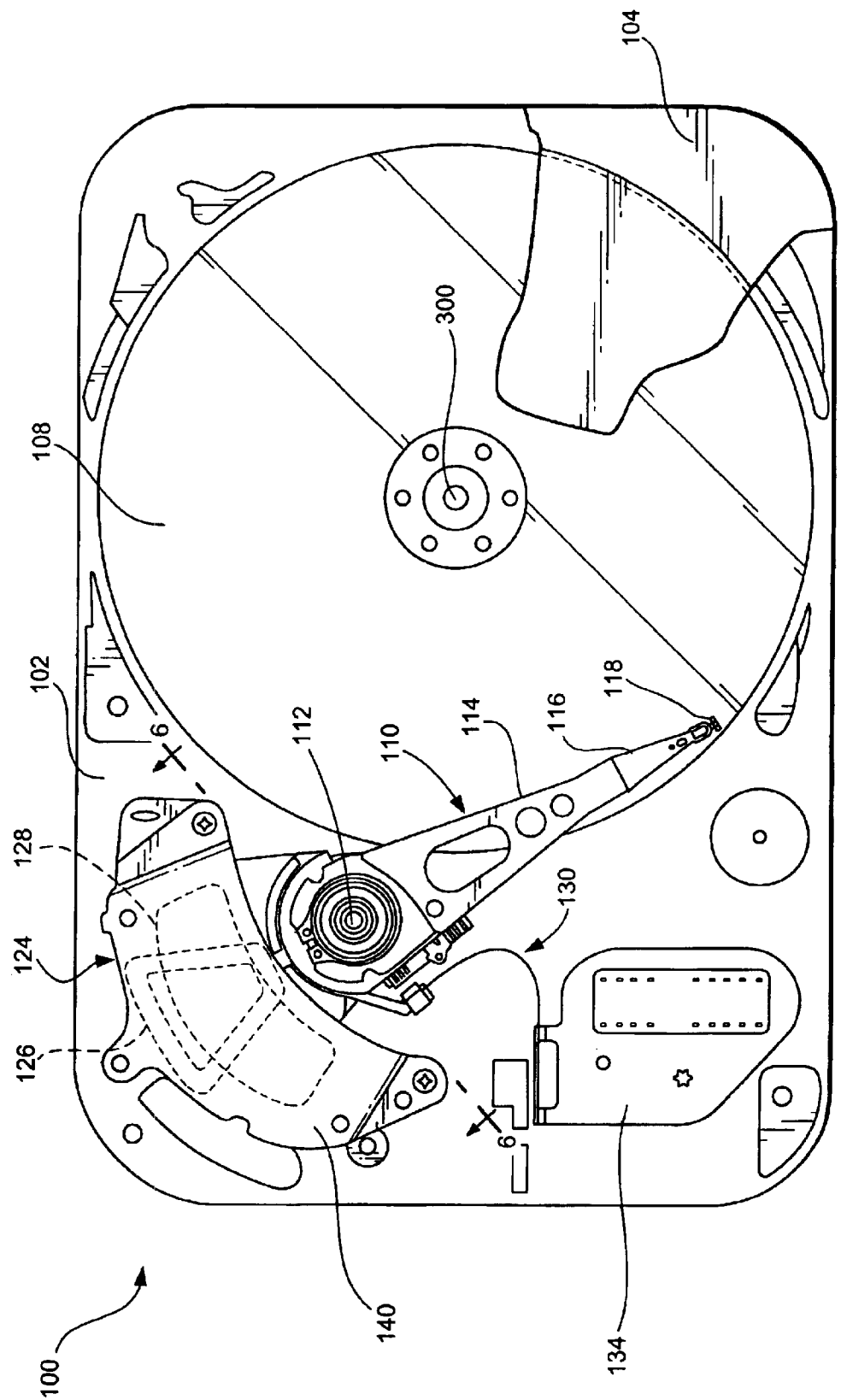
FIG. 1 is a plan view of a disc drive in accordance with an embodiment of the present invention illustrating the primary internal components of the disc drive.

FIG. 1 is a plan view illustrating the primary internal components of a disc drive incorporating one of the various embodiments of the present invention. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 300 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes a fluid bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 300 may be de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
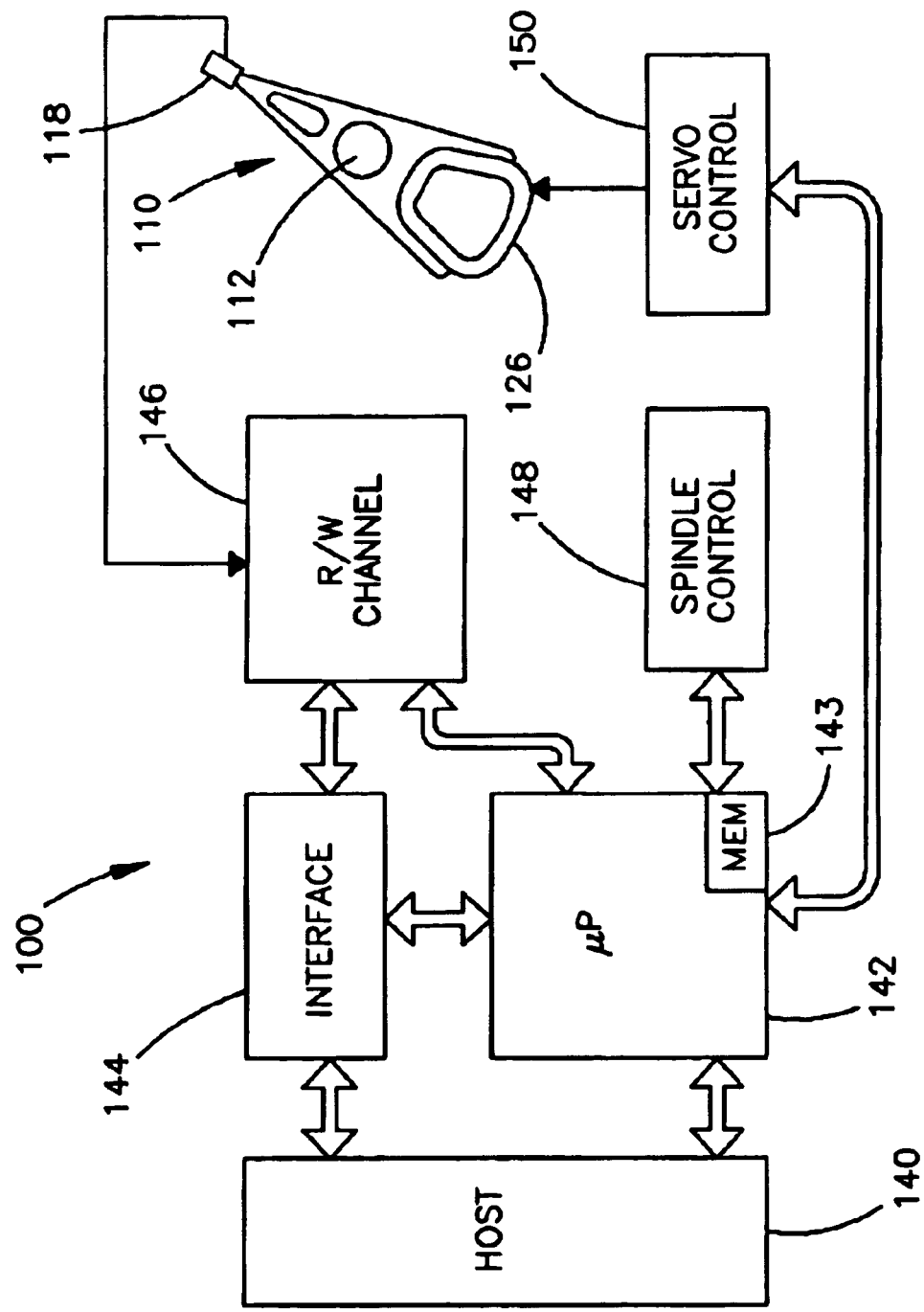
FIG. 2 is a control block diagram for the disc drive shown in FIG. 1 illustrating the primary functional components.

FIG. 2 is a control block diagram for a disc drive illustrating the primary functional components of a disc drive incorporating one of the various embodiments of the present invention and generally showing the main functional circuits which are resident on the disc drive printed circuit board and used to control the operation of the disc drive 100. The disc drive 100 is operably connected to a host computer 140 in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle motor control circuit 148, which typically electrically commutates the spindle motor 300 (FIG. 1) through the use, typically, of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted.

Data is transferred between the host computer 140 or other device and the disc drive 100 by way of an interface 144, which typically includes a buffer to facilitate high speed data transfer between the host computer 140 or other device and the disc drive 100. Data to be written to the disc drive 100 is thus passed from the host computer 140 to the interface 144 and then to a read/write channel 146, which encodes and serializes the data and provides the requisite write current signals to the heads 118. To retrieve data that has been previously stored in the data storage device 100, read signals are generated by the heads 118 and provided to the read/write channel 146, which performs decoding and error detection and correction operations and outputs the retrieved data to the interface 144 for subsequent transfer to the host computer 140 or other device.

Figure 3:
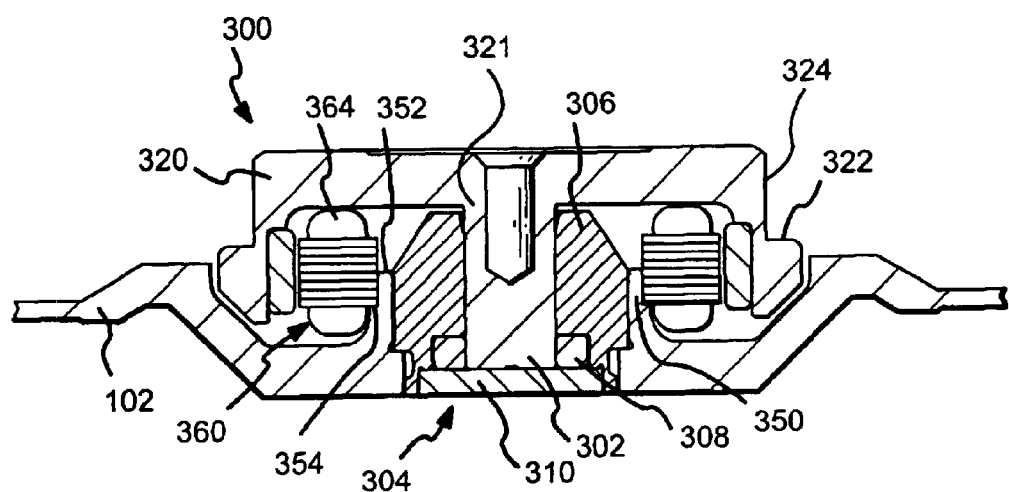
FIG. 3 is a cross sectional side view of a spindle motor in the drive shown in FIG. 1 including a hydrodynamic bearing.

FIG. 3 is a cross sectional side view of the spindle motor 300 including a hydrodynamic bearing. This example illustrates the spindle motor 300 secured to the base plate 102 of the data storage device 100. The spindle motor 300 is illustrated separately from the discs 108 and the top cover 104 for purposes of clarity. The spindle motor 300 in this example includes a rotating shaft 302 supported for rotation by a hydrodynamic bearing 304. Alternatively, the shaft 302 may be stationary and a rotating sleeve (not shown) around the shaft may be supported for rotation by a hydrodynamic bearing 304.

The hydrodynamic bearing 304 includes a sleeve 306 that forms a recess for receiving a thrust plate 308 at one end of the shaft 302. A counter plate 310 cooperates with surfaces of the thrust plate 308 to form a hydrodynamic thrust bearing which supports the shaft 302 for rotation. A hydrodynamic journal bearing is established in a gap (not shown) between the sleeve 306 and the rotating shaft 302 as well as the thrust plate 308 supported on the shaft 302. Specifically, the shaft 302 and the thrust plate 308 are supported for rotation by fluid inserted into the gap between the surfaces of the shaft and thrust plate, and the corresponding inner surface of the sleeve 306 and the counter plate 310. A pattern of grooves formed on these surfaces helps to establish appropriate pressures in the fluid used to form the hydrodynamic bearing 304, all in accordance with known technology in the field of hydrodynamic bearings.

A cylindrical shaped hub 320 extends radially outward from an upper end 321 of the shaft 302 and includes a bottom radial flange 322 and a cylindrical surface 324 extending upward from the flange 322 to support one or more discs 108. Once one or more discs 108 are loaded on the hub 320, a clamp ring is attached to a top surface 326 of the hub 320 to secure the discs 108 to the hub 320. A set of permanent magnets 330 are secured to an inner surface of the hub 320 to complete the rotor for the spindle motor 300.

The base plate 102 of the data storage device defines a recessed portion 340 for receiving the spindle motor 300. A cylindrical motor mount 350 is centered within the recessed portion 340 and defines an axial opening for receiving the sleeve 306 and counter plate 310 of the hydrodynamic bearing 304. The cylindrical motor mount 350 extends vertically upward and terminates at an upper end 352 that defines an annular ring. An inner cylindrical surface 356 of the cylindrical motor mount 350 supports an outer cylindrical 357 surface of the sleeve 306 while an outer cylindrical surface 358 of the motor mount 350 engages an inner cylindrical surface 359 of a stator 360.

The stator 360 is formed from a stack of stator laminations 362 and associated stator windings 364. While the stator 360 is preferably press fit around the outer cylindrical surface 358 of the motor mount 350, a bottom stator lamination 368 may be supported by a shoulder 354 formed in the outer cylindrical surface 358 of the motor mount 350. Additionally, the inner cylindrical surface 359 of the stator laminations 362 may be secured to the outer cylindrical surface 358 of the motor mount 350 by an adhesive.

Figure 4:
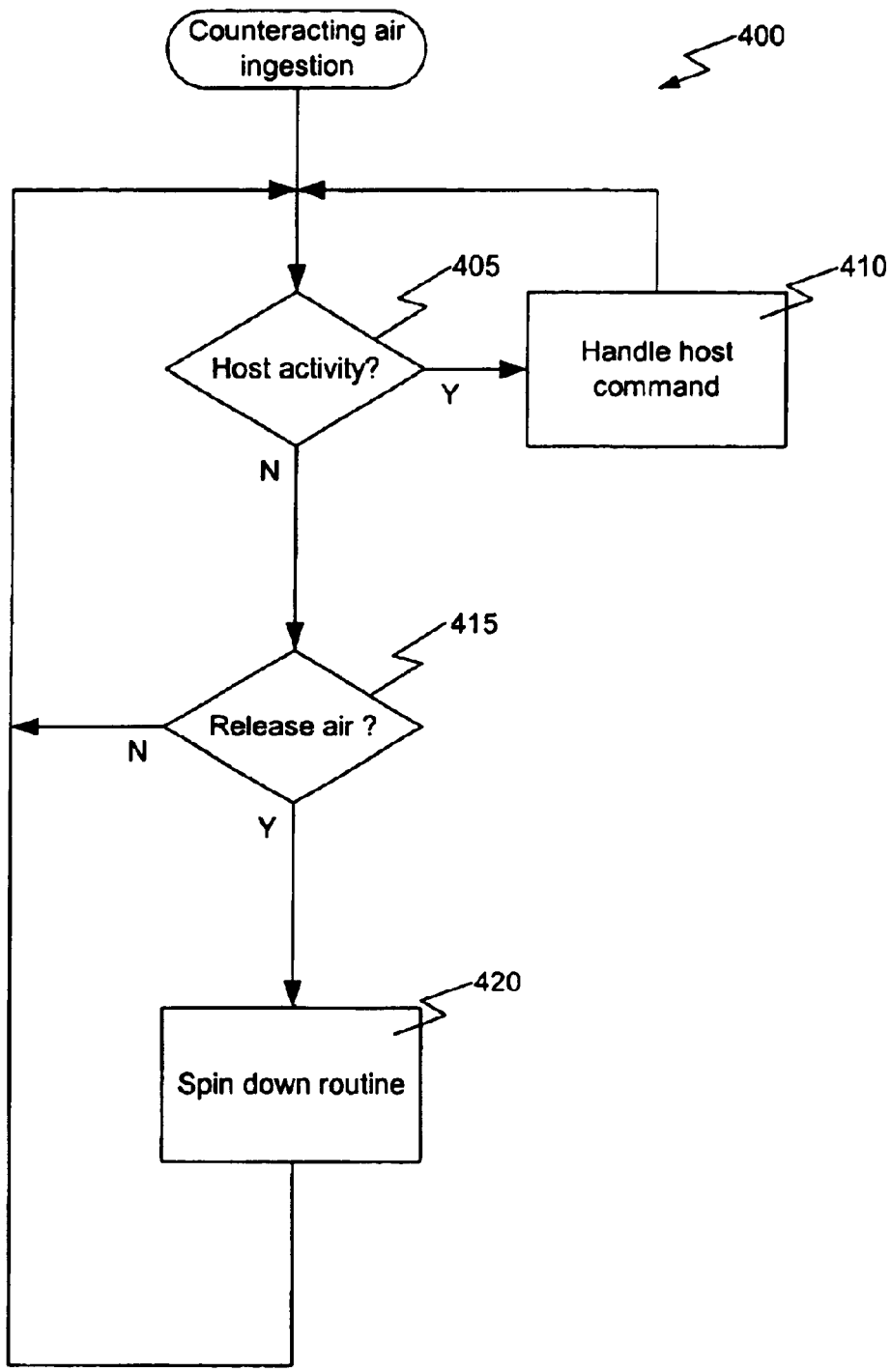
FIG. 4 is a flowchart illustrating, at a high level, a routine for counteracting gas ingestion in a hydrodynamic bearing spindle motor according to one embodiment of the present invention.

FIG. 4 is a flowchart illustrating, at a high level, a routine 400 for counteracting gas ingestion in a hydrodynamic bearing spindle motor according to one embodiment of the present invention. This routine 400 may be implemented in a series of instructions stored in the memory 143 of the disc drive 100 or other data storage device and executed by the microprocessor 142.

The routine 400 begins with a query operation 405 to determine whether there is activity from the host to which the data storage device may be connected. That is, a check is made as to whether any new commands have been received at the data storage device from the host. If a command has been received from the host, control passes to command handling operation 410 where the command will be handled. After handling the command in operation 410, control returns to query operation 405. Together, the loop between query operation 405 and command handling operation 410 may be considered to comprise waiting for activity of a host to which the data storage device is connected to become idle.

Once a determination is made at query operation 405 that the host has become idle, control passes to query operation 415. At query operation 415, a determination is made as to whether to release gas from the hydrodynamic bearing of the spindle motor. According to one embodiment of the present invention, as will be discussed below with reference to FIG. 6, this determination 415 may be based on comparing the amount of time since a previous spin down routine and a predetermined amount of time. Alternatively, this determination 415 may be based on other considerations. For example, the determination 415 may be based on a specified time of day having been passed.

If, at query operation 415, a determination to release gas from the hydrodynamic bearing of the spindle motor is made, control passes to a motor spin down routine 420. Details of one possible spin down routine will be discussed below with reference to FIG. 7. Regardless of the exact spin down routine to be used, spinning down or stopping the motor for a brief period of time allows the pressure within the hydrodynamic bearing to equalize which in turn allows gas trapped in the fluid to escape. Therefore, periodically performing a spin down routine reduces the number of failures due to gas ingestion into the fluid of the hydrodynamic bearing.

For clarity, FIG. 4 illustrates a routine for counteracting gas ingestion in a hydrodynamic bearing spindle motor as a stand-alone routine. However, this routine may be performed along with other routines that are normally handled during idle time of the data storage device. For example, there may be a number of utility routines that perform various housekeeping functions within the data storage device whenever the data storage device is idle. Therefore, the routine for counteracting gas ingestion in a hydrodynamic bearing spindle motor may be integrated with these other utilities in an idle time routine performed by the data storage device when it is not handling commands from a host.

Figure 5:
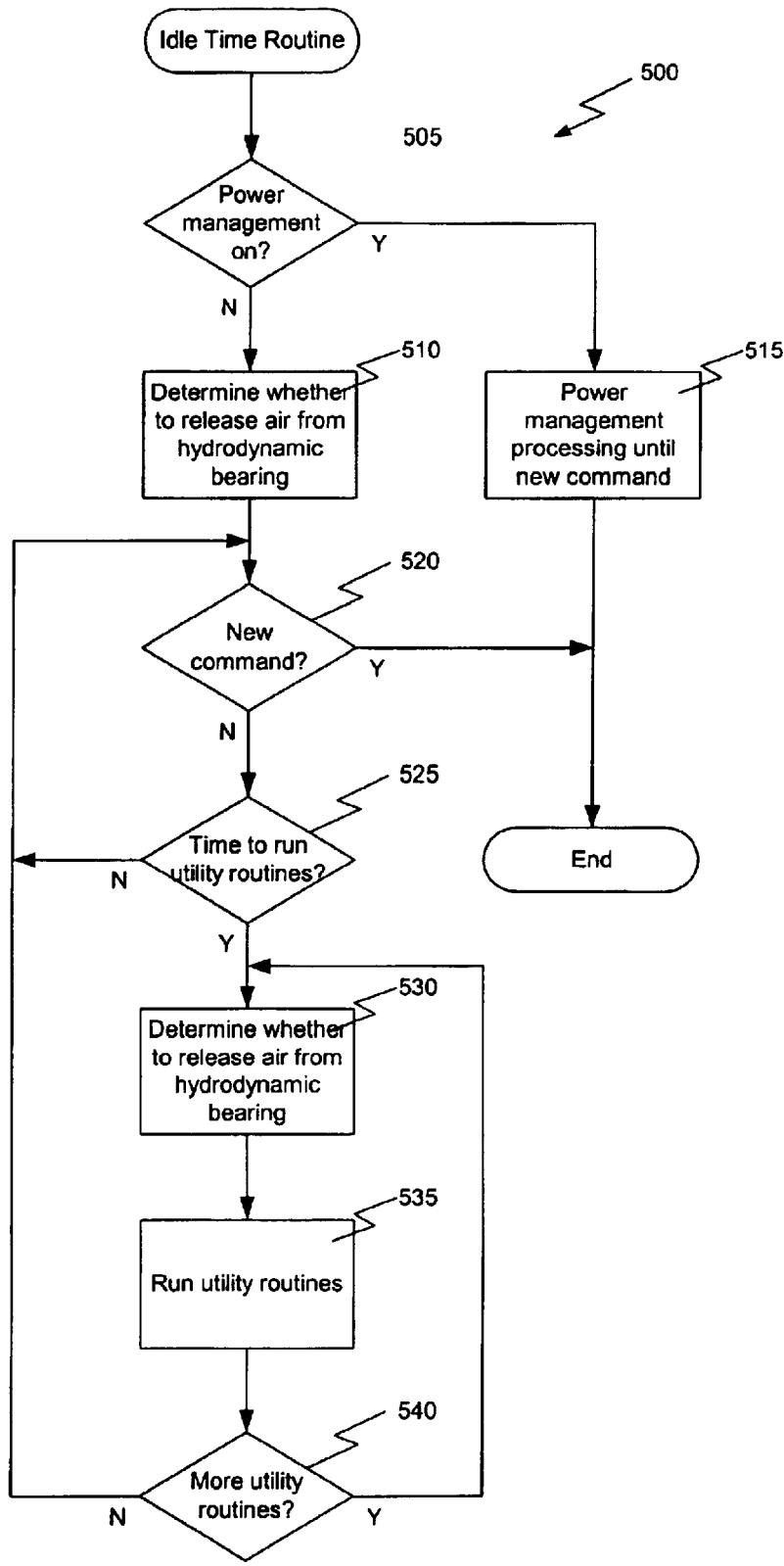
FIG. 5 is a flowchart illustrating an idle routine according to another embodiment of the present invention.

FIG. 5 is a flowchart illustrating an idle time routine according to another embodiment of the present invention. This routine 500 may be implemented in a series of instructions stored in the memory 143 of the disc drive 100 or other data storage device and executed by the microprocessor 142.

The routine 500 begins with a query operation 505 in which a determination is made as to whether the data storage device is in a power management mode. Many data storage devices utilize a power management mode that, in an effort to save wear on the mechanical components of the data storage device, shuts down the data storage device when it has not been in use for some time. If, at query operation 505, a determination is made that the data storage device is in a power management mode, control passes to power management processing operation 515 where power management mode continues until a new host command is received.

If the data storage device is not in power management mode at query operation 505, control passes to determination operation 510 where a determination is made as to whether to release gas from the hydrodynamic bearing of the spindle motor 300. That is, idle time routine 500 may, for example, call a subroutine or otherwise initiate another routine that will make the determination as to whether to release gas from the hydrodynamic bearing of the spindle motor 300. According to one embodiment of the present invention, as will be discussed below with reference to FIG. 6, this determination may be based on comparing the amount of time since a previous spin down routine and a predetermined amount of time. Alternatively, this determination may be based on other considerations. For example, the determination may be based on a specified time of day having been passed.

Control then passes to query operation 520 where a determination is made as to whether a new command has been received from the host. If a new command has been received, the idle routine ends and the new command is handled by the data storage device.

If no new command has been received at query operation 520, control passes to query operation 525 where a determination is made as to whether utility routines are to be performed. That is, utility routines that perform various housekeeping functions on the data storage device may be executed only periodically. Therefore, there may not be a current need for the utility routines to execute.

If utility processing is to be performed, control passes to determination operation 530 where another determination as to whether to release gas from the hydrodynamic bearing is made. As indicated above, this determination may be based on comparing the amount of time since a previous spin down routine and a predetermined amount of time as will be discussed below with reference to FIG. 6. Alternatively, this determination may be based on other considerations. For example, the determination may be based on a specified time of day having been passed.

Control then passes to utility operation 535 where other utility routines are performed. Such housekeeping utilities may include, for example, a utility that reads data off the media and re-writes or refreshes any data that is becoming difficult to read. After the utility routines are executed at utility operation 535, control passes to query operation 540.

At query operation 540 a determination may be made as to whether more utilities should be performed. If more utilities should be performed, control returns to determination operation 530. If no more utilities are to be performed, control returns to query operation 520 for a determination of whether a new host command has been received.

Regardless of other routines that might be done by the data storage device when it is not receiving commands from the host, the basic routine for counteracting gas ingestion in a hydrodynamic bearing spindle motor comprises waiting for activity of a host to which the data storage device is connected to become idle, determining whether to release gas from the hydrodynamic bearing of the spindle motor, and responsive to determining release gas from the hydrodynamic bearing performing a motor spin down routine for the hydrodynamic bearing spindle motor.

Figure 6:
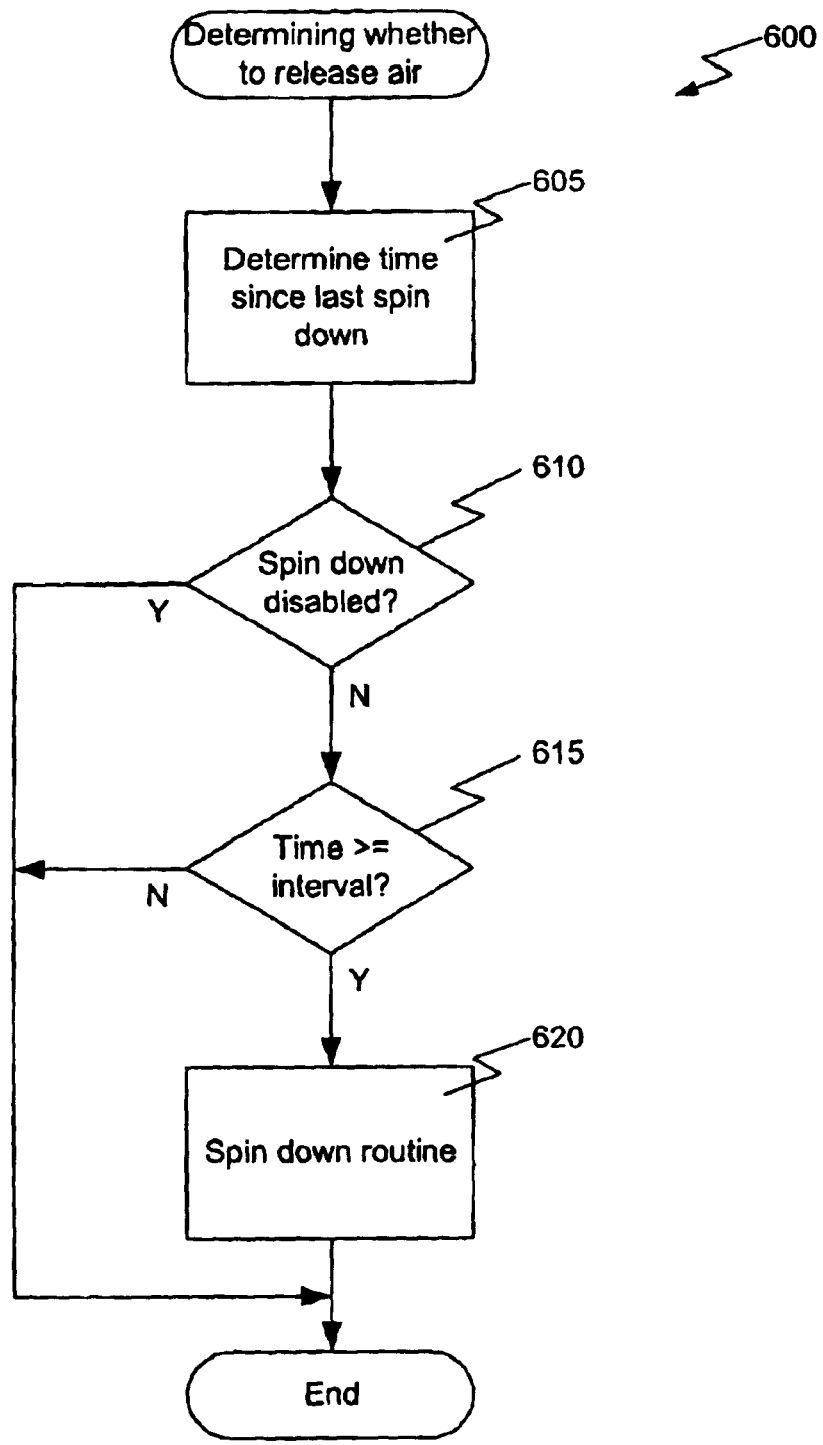
FIG. 6 is a flowchart illustrating a subroutine for determining whether to release gas from a hydrodynamic bearing according to another embodiment of the present invention.

FIG. 6 is a flowchart illustrating a routine for determining whether to release gas from a hydrodynamic bearing according to another embodiment of the present invention. This routine 600 may be implemented in a series of instructions stored in the memory 143 of the disc drive 100 or other data storage device and executed by the microprocessor 142.

The routine 600 begins with determination operation 605 where an amount of time since the previous spin down is determined. This time may be based on a simple counter, a time of day clock, or another means. For example, the time since the last spin down may be determined by the difference between a timer value stored when the last spin down was completed and the current value of that timer.

Control then passes to optional query operation 610 where a determination may be made as to whether the spin down routine has been disabled. That is, the spin down routine may be disabled by a software switch stored in memory or by another means. If, at query operation 610, a determination is made that the spin down routine has not been disabled, control passes to query operation 615.

At query operation 615, a comparison is made between the amount of time since the previous spin down and a predetermined amount of time between spin downs. For example, if the time since the previous spin down determined in determination operation 605 is found to be greater than or equal to a predetermined interval between spin downs, a spin down routine may be initiated at processing block 620. That is, determination routine 600 may call a subroutine that or otherwise initiate another routine that will perform a spindle motor spin down. Details of one possible spin down routine will be discussed below with reference to FIG. 7.

The exact value for the predetermined amount of time between spin downs may vary significantly depending upon the use of the data storage device. Considerations affecting the value used include usage of the data storage device and availability requirements balanced against prevention of failures due to wear caused by gas trapped in the fluid of the hydrodynamic bearing. According to one embodiment of the present invention, the predetermined amount of time may be less than or equal to 24 hours. According to another embodiment of the present invention, the predetermined amount of time may be 12 hours.

Figure 7:
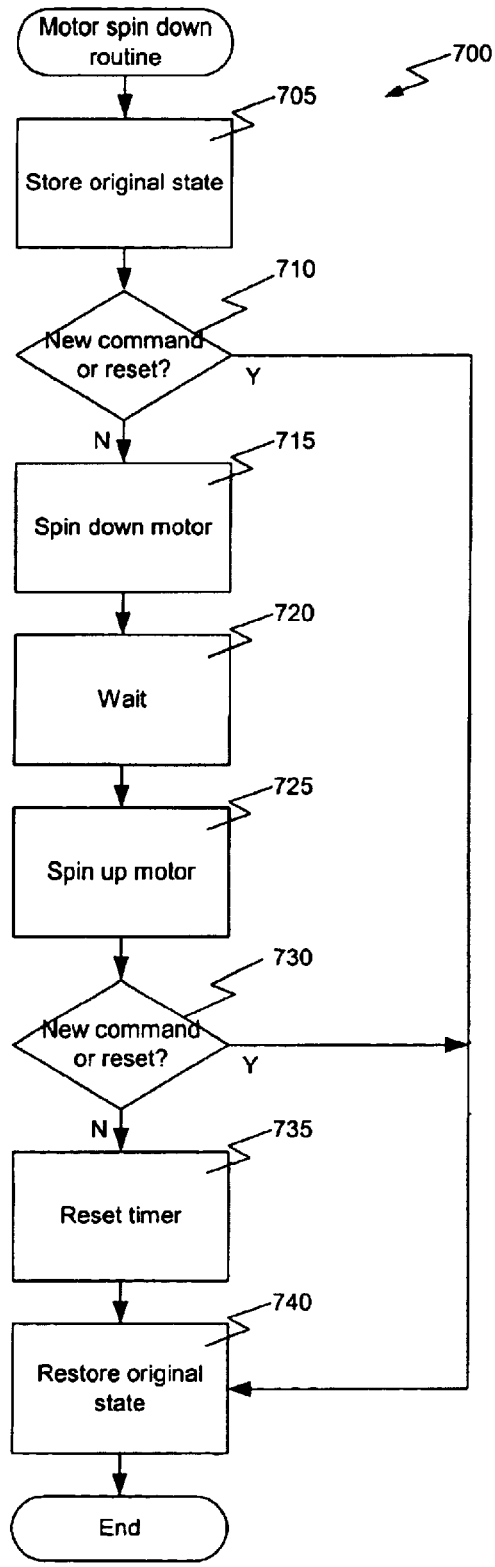
FIG. 7 is a flowchart illustrating a motor spin down subroutine according to a further embodiment of the present invention.

FIG. 7 is a flowchart illustrating a motor spin down routine according to a further embodiment of the present invention. This routine 700 may be implemented in a series of instructions stored in the memory 143 of the disc drive 100 or other data storage device and executed by the microprocessor 142.

The routine begins with store operation 705 where information regarding the original state of the data storage device is saved. For example, data that might be saved includes but is not limited to reset state information, data caches, interrupt states, etc. Control then passes to query operation 710.

At query operation 710 a determination is made regarding whether a new command or a reset request has been received. If a new command or a reset request has been received, control will pass to restore operation 740 where the original state information will be restored and the spin down routine will be aborted so that the command or request may be handled immediately.

If no new command or reset request is detected at query operation 710, control passes to spin down operation 715 where the motor will be spun down. This may involve simply turning off the motor. Optionally, there may be a slight delay before proceeding in order to allow the motor time to decelerate and stop. Of course, if used, this time delay may vary significantly depending on the motor, the size and number of discs in the data storage device, etc.

Control then passes to wait operation 720 where processing will pause for a short, predetermined interval. This pause allows the pressure within the hydrodynamic bearing to equalize which in turn allows gas trapped in the fluid to escape. This time may vary depending upon the motor used in the data storage device. However, the time will generally be brief and measured in seconds. For example, 2 to 5 seconds may be an adequate amount of time to allow gas to escape from the fluid in some hydrodynamic bearings. Of course, longer times may also be used ranging from 5 seconds to several minutes. After this time has passed, control passes to spin up operation 725.

At spin up operation 725 the motor is spun up or restarted. This may involve simply turning on the motor. Optionally, there may be a slight delay before proceeding in order to allow the motor time to accelerate to a normal operating speed. Of course, if used, this time delay may vary significantly depending on the motor, the size and number of discs in the data storage device, etc.

Control then passes to query operation 730. At query operation 730 another check may be made as to whether a new command or reset request has been received while the motor was stopped. If a new command or a reset request has been received, control passes to restore operation 740 where the original state information will be restored and the spin down routine will be aborted so that the command or request may be handled immediately. If no new command or reset request has been received, control passes to reset operation 735.

At reset operation 735 a timer indicating when the last spin down had been completed is reset. As discussed above, this timer may be used to determine when the spin down routine 700 will next be executed.

Control then passes to restore operation 740. At restore operation 740 the original state information for the data storage device stored during store operation 705 will be restored.

Described in another way, a method (such as 400) of counteracting gas ingestion in a hydrodynamic bearing (such as 304) of a spindle motor (such as 300) in a data storage device (such as 100), according to one embodiment of the present invention, comprises waiting for activity of a host connected with the data storage device (such as 100) to become idle. When the activity of the host becomes idle, a determination (such as 415 or 600) is made whether to release gas from a fluid of the hydrodynamic bearing (such as 304) of the spindle motor (such as 300). Responsive to determining to release gas from a fluid of the hydrodynamic bearing (such as 304) of the spindle motor (such as 300) a motor spin down routine (such as 420 or 700) for the spindle motor (such as 300) is performed.

According to another embodiment of the present invention, a data storage device (such as 100) comprises a spindle motor (such as 300) having a rotating shaft (such as 302), the rotating shaft (such as 302) supported by a hydrodynamic bearing (such as 304), a microprocessor (such as 142) coupled with the spindle motor (such as 300) to control rotation of the spindle motor (such as 300), and a memory (such as 143). The memory (such as 143) has stored thereon a series of instructions representing a routine (such as 400 or 500) to counteract gas ingestion in a hydrodynamic bearing (such as 304) of the spindle motor (such as 300) in the data storage device (such as 100). The routine, when executed by the microprocessor (such as 142), causes the microprocessor (such as 142) to wait for activity of a host to which the data storage device (such as 100) is connected to become idle, determine whether to release gas from a fluid of the hydrodynamic bearing (such as 304) of the spindle motor (such as 300), and responsive to determining to release gas from a fluid of the hydrodynamic bearing (such as 304) of the spindle motor (such as 300), perform a motor spin down routine for the spindle motor (such as 300).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the determination of whether to release gas from the hydrodynamic bearing may be based on criteria other than time or may use varying amounts of time between spin down routines. Additionally, the amount of time that the spindle motor is stopped during a spin down routine may vary. Further, one skilled in the art will recognize that the present invention may also be applied to any data storage device, such as an optical disc drive, a magneto-optical disc drive, or a compact disc drive, that utilizes a spindle motor having a hydrodynamic bearing. Numerous other changes may be made which will readily suggest themselves to those skilled in the art and which are encompassed in the spirit of the invention disclosed and as defined in the appended claims.

What is claimed is:

1. A method of counteracting gas ingestion in a hydrodynamic bearing of a spindle motor in a data storage device, the method comprising:
   waiting for activity of a host connected with the data storage device to become idle;
   determining whether to release gas from a fluid of the hydrodynamic bearing of the spindle motor; and
   responsive to determining to release gas from a fluid of the hydrodynamic bearing of the spindle motor, performing a motor spin down routine for the spindle motor.

2. The method of claim 1, wherein determining whether to release gas from a fluid of the hydrodynamic bearing of the spindle motor comprises:
   determining an amount of time since a previous spin down routine was performed; and
   comparing the amount of time since the previous spin down routine was performed to a predetermined amount of time.

3. The method of claim 2, wherein the predetermined amount of time is less than or equal to 24 hours.

4. The method of claim 2, wherein the predetermined amount of time is 12 hours.

5. The method of claim 1, wherein the motor spin down routine for the spindle motor comprises:
   storing original state information from the data storage device;
   spinning down the spindle motor from an operating speed to a stop;
   waiting for a predetermined amount of time;
   spinning up the spindle motor from a stop to the operating speed;
   resetting a timer; and
   restoring the original state information.

6. The method of claim 5, further comprising:
   determining whether a new command or reset request has been received by the data storage device from the host; and
   responsive to a new command or reset request being received, aborting the motor spin down routine.

7. The method of claim 6, wherein determining whether a new command or reset request has been received by the data storage device from the host is performed prior to spinning down the spindle motor.

8. The method of claim 6, wherein determining whether a new command or reset request has been received by the data storage device from the host is performed after spinning up the spindle motor.

9. The method of claim 5, wherein the predetermined amount of time comprises 2 to 5 seconds.

10. The method of claim 5, wherein the predetermined amount of time comprises 5 seconds.

11. A data storage device comprising:
    a spindle motor having a rotating shaft, the rotating shaft supported by a hydrodynamic bearing;
    a microprocessor coupled with the spindle motor to control rotation of the spindle motor; and
    a memory, the memory having stored thereon a series of instructions representing a routine to counteract gas ingestion in a hydrodynamic bearing of the spindle motor in the data storage device, the routine, when executed by the microprocessor, causes the microprocessor to wait for activity of a host to which the data storage device is connected to become idle, determine whether to release gas from a fluid of the hydrodynamic bearing of the spindle motor, and responsive to determining to release gas from the fluid of the hydrodynamic bearing of the spindle motor, perform a motor spin down routine for the spindle motor.

12. The data storage device of claim 11, wherein the microprocessor determines whether to release gas from the fluid of the hydrodynamic bearing of the spindle motor by:
    determining an amount of time since a previous spin down routine was performed; and
    comparing the amount of time since the previous spin down routine was performed to a predetermined amount of time.

13. The data storage device of claim 12, wherein the predetermined amount of time is less than or equal to 24 hours.

14. The data storage device of claim 12, wherein the predetermined amount of time is 12 hours.

15. The data storage device of claim 11, wherein the motor spin down routine for the spindle motor comprises:
    storing original state information from the data storage device;

spinning down the spindle motor from an operating speed to a stop;

waiting for a predetermined amount of time;

spinning up the spindle motor from a stop to the operating speed;

resetting a timer; and restoring the original state information.

16. The data storage device of claim 15, wherein the motor spin down routine further comprises:

determining whether a new command or reset request has been received by the data storage device from the host; and responsive to a new command or reset request being received, aborting the motor spin down routine.

17. The data storage device of claim 16, wherein determining whether a new command or reset request has been received by the data storage device from the host is performed prior to spinning down the spindle motor.

18. The data storage device of claim 16, wherein determining whether a new command or reset request has been received by the data storage device from the host is performed after spinning up the spindle motor.

19. The data storage device of claim 15, wherein the predetermined amount of time comprises 2 to 5 seconds.

20. The data storage device of claim 15, wherein the predetermined amount of time comprises 5 seconds.

21. A machine-readable medium having stored thereon a series of instructions representing a routine to counteract gas ingestion in a hydrodynamic bearing of a spindle motor in a data storage device, the routine, when executed by a processor, causes the processor to:

wait for activity of a host to which the data storage device is connected to become idle;

determine whether to release gas from a fluid of the hydrodynamic bearing of the spindle motor; and responsive to determining to release gas from a fluid of the hydrodynamic bearing of the spindle motor, perform a motor spin down routine for the spindle motor.

22. The machine-readable medium of claim 21, wherein determining whether to release gas from a fluid of the hydrodynamic bearing of the spindle motor comprises:

determining an amount of time since a previous spin down routine was performed; and comparing the amount of time since the previous spin down routine was performed to a predetermined amount of time.

23. The machine-readable medium of claim 22, wherein the predetermined amount of time is less than or equal to 24 hours.

24. The machine-readable medium of claim 22, wherein the predetermined amount of time is 12 hours.

25. The machine-readable medium of claim 21, wherein the motor spin down routine for the spindle motor comprises:

storing original state information from the data storage device;

spinning down the spindle motor from an operating speed to a stop;

waiting for a predetermined amount of time;

spinning up the spindle motor from a stop to the operating speed;

resetting a timer; and restoring the original state information.

26. The machine-readable medium of claim 25, further comprising:

determining whether a new command or reset request has been received by the data storage device from the host; and responsive to a new command or reset request being received, aborting the motor spin down routine.

27. The machine-readable medium of claim 26, wherein determining whether a new command or reset request has been received by the data storage device from the host is performed prior to spinning down the spindle motor.

28. The machine-readable medium of claim 26, wherein determining whether a new command or reset request has been received by the data storage device from the host is performed after spinning up the spindle motor.

29. The machine-readable medium of claim 25, wherein the predetermined amount of time comprises 2 to 5 seconds.

30. The machine-readable medium of claim 25, wherein the predetermined amount of time comprises 5 seconds.

* * * * *

UNITED STATES PATENT AND TRADEMARK OFFICE
CERTIFICATE OF CORRECTION

PATENT NO. : 6,985,324 B2
DATED : January 10, 2006
INVENTOR(S) : Martin et al.

It is certified that error appears in the above-identified patent and that said Letters Patent is hereby corrected as shown below:

<u>Title page,</u>
Item [75], Inventors, should read:
-- Steven R. Martin, Louisville, CO (US)
   James A. Herbst, Longmont, CO (US)
   Eric N. Heiney, Loveland, CO (US)
   Bradley J. Gill, Longmont, CO (US) --.

Signed and Sealed this

Fourth Day of April, 2006

JON W. DUDAS
*Director of the United States Patent and Trademark Office*